Dec. 2, 1941.   C. I. BAKER ET AL   2,264,735
VACUUM TUBE GRID
Original Filed Dec. 13, 1938
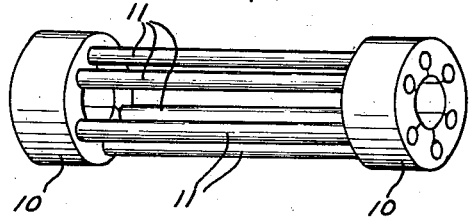
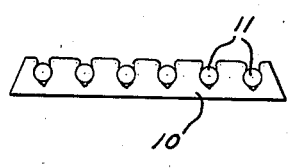
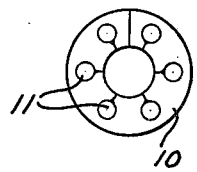
INVENTORS
C. I. BAKER
V. D. BARKER
C. W. MAURER
BY
E. R. Nowlan
ATTORNEY Patented Dec. 2, 1941

2,264,735

UNITED STATES PATENT OFFICE 2,264,735

VACUUM TUBE GRID

Carl I. Baker, Pearl River, N. Y., Virgil D. Barker, Westfield, N. J., and Carl W. Maurer, Freeport, N. Y., assignors to Western Electric Company, Incorporated, New York, N. Y., a corporation of New York Original application December 13, 1938, Serial No. 245,418. Divided and this application June 2, 1939, Serial No. 277,028

2 Claims. (Cl. 250—27.5)

This is a division of our copending application, Serial No. 245,418, filed December 13, 1938, now Patent #2,225,853 of December 24, 1940.

This invention relates to vacuum tube grids, and more particularly to vacuum tube grids of the barrel type.

Vacuum tube grids of the barrel type have been formed in some cases by welding the grid wires to their supports. In thus welding the fine grid wires much care must be taken to form a satisfactory connection and avoid burning of the wires, and even then it is difficult to form a grid uniform and precise in contour.

An object of the invention is to provide vacuum tube grids simple and efficient in structure and uniform in contour.

With this and other objects in view, the invention comprises a grid having spaced heads grooved to receive the ends of grid wires, which heads are bent into circular contour to close the grooves and grip the ends of the wires therein.

Other objects and advantages will be apparent from the following detailed description taken in conjunction with the accompanying drawing, wherein Fig. 1 is a perspective view of the grid;

Fig. 2 is an end elevational view of the grid before the heads are formed to close the grooves to embed the ends of the grid wires in the heads, and Fig. 3 is an end view of the grid, showing the grid wires embedded in the heads.

Referring now to the drawing, it will be observed that the grid is composed mainly of spaced heads 10, with grid wires 11 having their ends embedded in the heads. In the illustration of the grid in the drawing these parts of the grid are greatly enlarged, particularly the grid wire, while in the actual structure the grid wires are only about .005 inch in diameter. Wires so small in diameter are difficult to handle and far more difficult to weld. To weld the grid wires to the heads would necessitate forming the welding connection upon the outer periphery of the heads, leaving rough portions which could not be removed without damaging the wire and without extreme care during the welding operations the grid wires might be burned sufficiently to break at the time of welding or subsequent thereto.

In the present disclosure the heads 10 are formed of suitable material having flattened surfaces or of suitable round material flattened to the desired dimensions. This material of the heads is provided with spaced grooves in any suitable manner, which grooves are of sufficient size and preferably V-shaped in contour to receive the ends of the grid wires and of sufficient width and depth to locate the ends of the grid wires in a common plane substantially adjacent the center of each head. When the grid wires are first swaged (Fig. 2), for example, by a compressing operation, to cause holding of the grid wires against displacement, after which the heads are thus positioned the heads are bent into the annular form shown in Figs. 1 and 3, completing the closure of the grooves about the ends of the grid wires and embedding the said ends in place so firmly that the heads and grid wires are inseparable and form desirable electrical connections. The closing of the grooves transforms what was originally a serrated surface into a smooth inner surface of each head, the outer surfaces thereof remaining smooth and uniform throughout their contours. If desired the ends of the members forming the heads may be tapered suitably so that they will closely engage, as illustrated in Fig. 2, throughout their surface area. This type of grid, therefore, has equally spaced grid wires positioned in circular formation within the outside dimensions of the grid determined by the outer peripheries of the heads, the ends of the grid wires being embedded in the heads and firmly gripped the full width of the head. The firm gripping of the ends of the grid wires the full width of each of the ends makes possible the stretching of the grid wires, which is a customary step in forming grids, without injury to the wires. This is an advantage over the types of grids wherein the grid wires are welded to the ends, in that the welding of such fine wires as aforementioned weakens the wires and they are only secured or held to the ends by the point of the welding and not for the full width of the ends.

This embodiment of the invention is illustrative only and may be widely modified and departed from in many ways without departing from the spirit and scope of the invention as pointed out in and limited only by the appended claims.

What is claimed is:

1. A grid comprising grid wires, and spaced heads with grooves to receive the grid wires in engagement with the walls thereof, the walls of the grooves being caused to firmly grip the wires by the heads having been formed circularly.

2. A grid comprising grid wires, and spaced heads with grooves to receive the grid wires in engagement with the walls thereof, the walls of the grooves being caused to firmly grip the wires by the heads having been formed circularly to close the grooves about the wires.

CARL I. BAKER.
VIRGIL D. BARKER.
CARL W. MAURER.